(12) United States Patent
Mochida

(10) Patent No.: US 7,093,487 B2
(45) Date of Patent: Aug. 22, 2006

(54) ANGULAR-RATE DETECTING APPARATUS

(75) Inventor: Yoichi Mochida, Fujisawa (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/924,439

(22) Filed: Aug. 24, 2004

(65) Prior Publication Data

US 2005/0066726 A1 Mar. 31, 2005

(30) Foreign Application Priority Data

Sep. 29, 2003 (JP) ............................. 2003-338507

(51) Int. Cl.
*G01P 9/04* (2006.01)
(52) U.S. Cl. .................. 73/504.14; 73/506.16
(58) Field of Classification Search ............. 73/504.02, 73/504.04, 504.12, 594.14, 504.15, 504.16
See application file for complete search history.

(56) References Cited

U.S. PATENT DOCUMENTS

| | | | |
|---|---|---|---|
| 6,044,707 A | | 4/2000 | Kato |
| 6,122,962 A | * | 9/2000 | Yoshino et al. ........... 73/504.14 |
| 6,134,961 A | * | 10/2000 | Touge et al. ............. 73/504.12 |
| 6,240,780 B1 | * | 6/2001 | Negoro et al. ........... 73/504.12 |
| 6,539,803 B1 | * | 4/2003 | Mochida .................. 73/504.12 |
| 6,742,390 B1 | * | 6/2004 | Mochida et al. ......... 73/504.14 |
| 6,877,374 B1 | * | 4/2005 | Geen ....................... 73/504.14 |
| 2002/0078746 A1 | * | 6/2002 | Mochida .................. 73/504.12 |

FOREIGN PATENT DOCUMENTS

| | | |
|---|---|---|
| GB | 2 384 054 A | 7/2003 |
| JP | 2002-081939 | 3/2002 |
| JP | 2003-202226 | * 7/2003 |

OTHER PUBLICATIONS

Official communication dated Jan. 27, 2006, Issued in the corresponding Korean Patent Application No. 10-2004-0073652.

* cited by examiner

*Primary Examiner*—Helen Kwok
(74) *Attorney, Agent, or Firm*—Keating & Bennett, LLP

(57) ABSTRACT

An Angular-rate detecting apparatus includes four mass portions connected by at least one support beam, and the mass portions have respective individual vibration generators disposed thereon. The individual vibration generators excite the normal vibration mode by vibrating pairs of the mass portions adjacent to each other in opposite phases. Thus, the mass portions are forcibly vibrated in the normal vibration mode. Angular rate detectors detect displacements of inner frames of central mass portions as an angular rate about an axis perpendicular to a detection direction and also to a vibration direction when the inner frames are displaced in the detection direction while vibrating in the vibration direction.

19 Claims, 9 Drawing Sheets

COMPARATIVE EXAMPLE 4
DISPLACED STATE OF EACH MASS PORTION DUE TO STATIC DRIVE FORCE WHEN ONLY OUTER MASS PORTIONS ARE DRIVEN

ANGULAR-RATE DETECTING APPARATUS

BACKGROUND OF THE INVENTION

1. Field of the Invention

The present invention relates to an angular-rate detecting apparatus for detecting an angular rate of a rotating body.

2. Description of the Related Art

A known angular-rate detecting apparatus is an angular rate sensor which detects a displacement of a mass portion due to a Coriolis force as an angular rate by utilizing the principle that a mass portion vibrating in a given direction undergoes a Coriolis force in accordance with an angular rate (for example, see Japanese Unexamined Patent Application Publication No. 2002-81939).

Such an angular rate sensor according to the known art includes three mass portions that are juxtaposed to one another on a substrate, and these mass portions are connected by support beams so as to be vibratable in the X-axis direction. Also, each support beam has fixing portions, each disposed between two of the mass portions so as to fix central longitudinal portions of the support beam to the substrate.

Also, the central mass portion includes a vibration generator disposed thereon, generating an electrostatic force between the mass portion and the substrate when an external drive signal (voltage) is applied to the generator. In this case, when the vibration generator vibrates the central mass portion with the electrostatic force in the X-axis direction, the outside mass portions adjacent to the central mass portion are vibrated in reverse phase. With this structure, according to the known art, the mass portions are kept in a constant resonant state while two of the mass portions adjacent to each other vibrate in reverse phase with the fixing portions functioning as nodes.

When a torque, for example, about the Y-axis is applied to the sensor while these mass portions are vibrating, each outside mass portion is displaced in the Z-axis direction since it undergoes a Coriolis force in accordance with its vibrating state. In this case, the outside mass portion has an angular rate detector disposed thereon in which the capacitance between the outside mass portion and the substrate varies in accordance with the displacement in the Z-axis direction. Thus, the angular rate detector detects the displacement of the outside mass portion as an angular rate about the Y-axis as a variance in capacitance.

In the meantime, according to the known art, the mass portions are kept in a constant resonant state while the central and outside mass portions are vibrated in opposite phases. However, each mass portion has not only a vibration mode in which two of the mass portions adjacent to each other vibrate in opposite phases (hereinafter, this vibration mode is referred to as the normal vibration mode) but sometimes also has a plurality of vibration modes. For example, when a large number of mass portions are connected, the number of vibration modes other than the normal vibration mode (that is, the number of vibration modes in which any two of mass portions adjacent to each other do not vibrate in opposite phases) increases.

Accordingly, in the known art, a vibration mode other than the normal vibration mode is likely to be excited, for example, at the time of starting up the sensor, as a result, a period of startup time from startup of the sensor to excitation of the normal vibration mode is longer or a drive signal at a high signal level (a high voltage) is needed to be inputted into the vibration generator in order to excite and maintain the normal vibration mode, thereby causing a problem of deterioration in performances at the time of startup or an increase in power consumption.

Also, when each mass portion vibrates continuously in a vibration mode other than the normal vibration mode, the amplitude and the vibration frequency of the vibration becomes unexpectedly unstable, thereby causing another problem of deterioration in detection accuracy or reliability required as a sensor.

SUMMARY OF THE INVENTION

To overcome the above-described problems, preferred embodiments of the present invention provide an angular-rate detecting apparatus in which two mass portions adjacent to each other are vibrated in opposite phases, the normal vibration mode is maintained even at the time of starting up the detecting apparatus, and improvements in detection accuracy and reliability are achieved.

An angular-rate detecting apparatus according to a preferred embodiment of the present invention includes a substrate, a plurality of mass portions juxtaposed to one another on the substrate in a predetermined direction, a support beam connecting the mass portions so as to enable each mass portion to be vibratable in a vibration direction substantially perpendicular to the direction along which the mass portions are juxtaposed to one another, a fixing portion fixing the support beam to the substrate, vibration generators vibrating two mass portions adjacent to each other in opposite phases in the vibration direction, and an angular rate detector detecting a displacement of a portion of the mass portions as an angular rate, displaced in a detection direction substantially perpendicular to the vibration direction in a state in which the mass portions are vibrating.

In the angular-rate detecting apparatus according to preferred embodiments of the present invention, the vibration generators preferably exert drive forces on the two mass portions adjacent to each other in opposite directions from each other.

In the angular-rate detecting apparatus according to preferred embodiments of the present invention, the vibration generators are preferably individually disposed as individual vibration generators corresponding to the respective mass portions, and two individual vibration generators adjacent to each other generate drive forces in the opposite directions from each other.

In the angular-rate detecting apparatus according to preferred embodiments of the present invention, among the mass portions, the ratio among the magnitudes of drive forces exerted on the respective mass portions by the vibration generators is preferably set so as to be substantially the same as the ratio among the products of masses and driven amplitudes of the corresponding mass portions.

An angular-rate detecting apparatus according to another preferred embodiment of the present invention includes a substrate, a plurality of mass portions juxtaposed to one another on the substrate in a predetermined direction, a support beam connecting the mass portions so as to allow each mass portion to be vibratable in a vibration direction substantially perpendicular to the direction along which the mass portions are juxtaposed to one another, a fixing portion fixing the support beam to the substrate, an angular rate detector detecting a displacement of a portion of the mass portions as an angular rate, displaced in a detection direction substantially perpendicular to the vibration direction in a state in which the mass portions are vibrating, at least one of the mass portions including a vibration generator disposed thereon, and another one of the mass portions adjacent to the at least one of the mass portions including a vibration monitor disposed thereon, monitoring the vibrating state thereof and outputting monitor signal for controlling the vibration generator such that the mass portions adjacent to each other vibrate in opposite phases in the vibration direction.

In the angular-rate detecting apparatus according to preferred embodiments of the present invention, the vibration monitor preferably outputs a normal monitor signal when the at least one of the mass portions and the another one of mass portion vibrate in opposite phases, and the vibration generator and the vibration monitor preferably includes a control circuit disposed therebetween, the control circuit a maintains each of the mass portions in a resonant state by the vibration generator when the normal monitor signal is input to the control circuit from the vibration monitor.

In the angular-rate detecting apparatus according to preferred embodiments of the present invention, the mass portions preferably include four pieces of mass portions linearly juxtaposed to one another.

In the angular-rate detecting apparatus according to preferred embodiments of the present invention, since the vibration generators are disposed so as to exert drive forces on the two mass portions adjacent to each other in the opposite directions from each other, the two mass portions adjacent to each other are forcibly vibrated in opposite phases with the drive forces exerted by the vibration generators, thereby exciting a predetermined vibration mode (the normal vibration mode). With this structure, without excessively increasing the magnitudes of the drive forces (drive signals), for example, when starting up the apparatus, the normal vibration mode is effectively excited upon startup of the vibration generators, and the period of the startup time of the apparatus is reduced while inhibiting power consumption of the same.

Further, problems such as no normal vibration mode being excited and a vibration mode other than the normal vibration mode being excited are reliably prevented, and the excitation of the normal vibration mode is easily maintained. Accordingly, the performance of the detecting apparatus during a period of time including the startup time is stabilized, and thus incorrect operation is prevented, thereby accurately detecting an angular rate and improving detection accuracy and reliability.

In the angular-rate detecting apparatus according to preferred embodiments of the present invention, since the vibration generators are individually disposed as the individual vibration generators corresponding to the respective mass portions, and the two individual vibration generators adjacent to each other generate drive forces in the opposite directions from each other, the individual generators exert drive forces on the two portions adjacent to each other in the opposite directions from each other, thereby reliably and easily exciting the normal vibration mode.

In the angular-rate detecting apparatus according to preferred embodiments of the present invention, since the ratio among the magnitudes of drive forces exerted on the respective mass portions by the vibration generators is set so as to be substantially the same as the ratio among the products of the masses and driven amplitudes of the corresponding mass portions, a displaced state of each mass portion statically displaced with a predetermined external force (drive force) (that is, a displaced state of the mass portion due to a static drive force) is substantially the same as a vibrating state of the mass portion in the normal vibration mode, thereby improving excitation efficiency of the normal mode of vibration.

Further, since the ratio among drive forces exerted on the respective mass portions by the vibration generators can be appropriately set, a predetermined drive signal (drive voltage) causes each mass portion having, for example, a predetermined Q value to produce a large amplitude, thereby improving excitation efficiency of the normal mode up to the maximum level and also improving detection sensitivity. Also, by inhibiting excitation of a vibration mode other than the normal vibration mode, a vibration mode (detection mode) is also prevented from being excited, for example, in the detection direction. With this arrangement, the mass portions are prevented from being displaced in the detection direction independently of an angular rate, thereby preventing noises from being generated in a detection signal and drift of the detection signal, thereby providing a stable detection operation.

In the angular-rate detecting apparatus according to preferred embodiments of the present invention, since at least one of the mass portions has a vibration generator disposed thereon, and another one of the mass portions adjacent to the at least one of the mass portions has a vibration monitor disposed thereon, when the apparatus is operating, a vibration of the at least one of the mass portions driven by the vibration generator is transferred to the another one of the mass portions via at least one support beam, thereby causing the another one of mass portions to vibrate. Also, when the at least one of the mass portions is driven, a vibrating state of the another one of the mass portions is monitored by the vibration monitor. Thus, by controlling a state of the drive force (drive signal) by using the monitored result, the at least one of the mass portions and the another one of the mass portions vibrate in opposite phases.

With this structure, without excessively increasing the magnitudes of the drive forces, the normal vibration mode is effectively excited, and the period of the startup time of the apparatus is reduced while inhibiting power consumption of the same. Also, problems such as no normal vibration mode being excited and a vibration mode other than the normal vibration mode being excited are reliably prevented, and excitation of the normal vibration mode is easily maintained. Accordingly, the performance of the detecting apparatus is stabilized, an angular rate is accurately detected, and detection accuracy and reliability are improved.

In the angular-rate detecting apparatus according to preferred embodiments of the present invention, since the vibration monitor outputs a normal monitor signal when the at least one of the mass portions and the another one of the mass portions vibrate in opposite phases, and the control circuit maintains each of the mass portions in a resonant state with the vibration generator when the normal monitor signal is input to the control circuit from the vibration monitor, the vibration monitor outputs a normal monitor signal when the normal vibration mode is excited, and outputs a monitor signal having a waveform different from that of the normal monitor signal when a vibration mode other than the normal vibration mode is excited.

With this structure, the control circuit maintains each of the mass portions in a resonant state with the vibration generator when the normal monitor signal is input. Also, when a monitor signal other than the normal monitor signal is input to the control circuit from the vibration monitor, since the control circuit feeds back a drive signal to be output to the vibration generator so as to excite the normal vibration mode, only the normal vibration mode is stably excited.

In the angular-rate detecting apparatus according to preferred embodiments of the present invention, since the mass portions are defined by four pieces of mass portions linearly juxtaposed to one another, the four mass portions are symmetrically arranged with respect to the center of gravity of the overall mass portions, each of the mass portions vibrates stably in an opposite phase with mass portions adjacent thereto while maintaining the center of gravity G of the overall mass portions at a substantially constant position. Also, even when each mass portion has, for example, a slight dimensional or manufacturing error, a difference in resonant frequencies caused by the above-mentioned error is compensated by the symmetrical geometry.

With this structure, by vibrating two of the mass portions in opposite phases in a well-balanced manner, reaction forces thereof at the time of vibration cancel each other out, thereby reliably inhibiting the vibration thereof from being transferred to the substrate. Accordingly, for example, when displacements of a portion of the mass portions displaced in the detection direction in accordance with an angular rate are detected as the angular rate, deterioration in detection accuracy caused by vibrations of the substrate are prevented, and as a result, the angular rate is accurately detected.

These and various other features, elements, steps, characteristics and advantages of the present invention will become more apparent from the following detailed description of preferred embodiments thereof with reference to the attached drawings.

DETAILED DESCRIPTION OF PREFERRED EMBODIMENTS

An angular-rate detecting apparatus according to preferred embodiments of the present invention will be described in detail with reference to the attached drawings.

Figure 1:
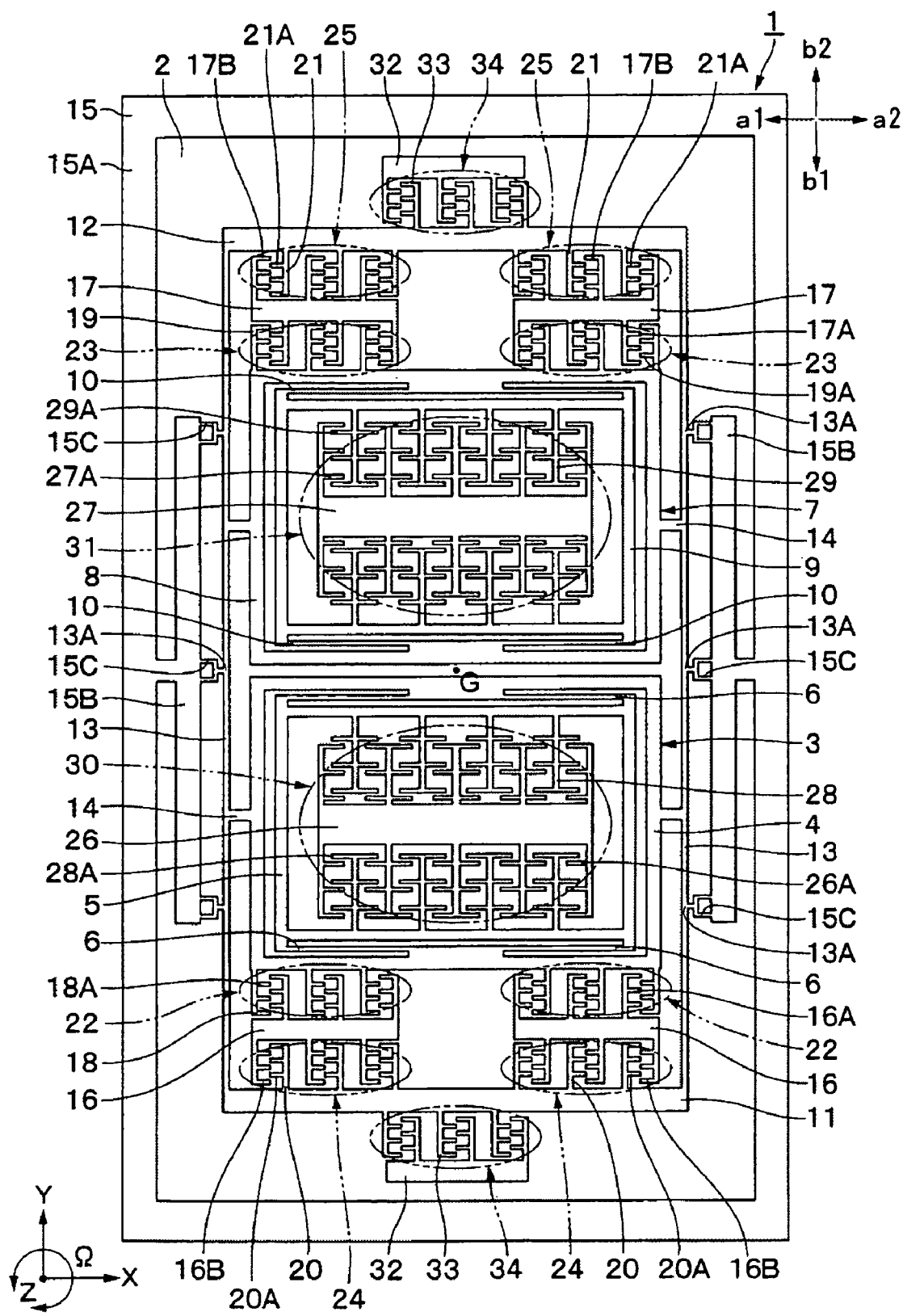
FIG. 1 is a plan view of an angular rate sensor according to a first preferred embodiment of the present invention.
Figure 2:
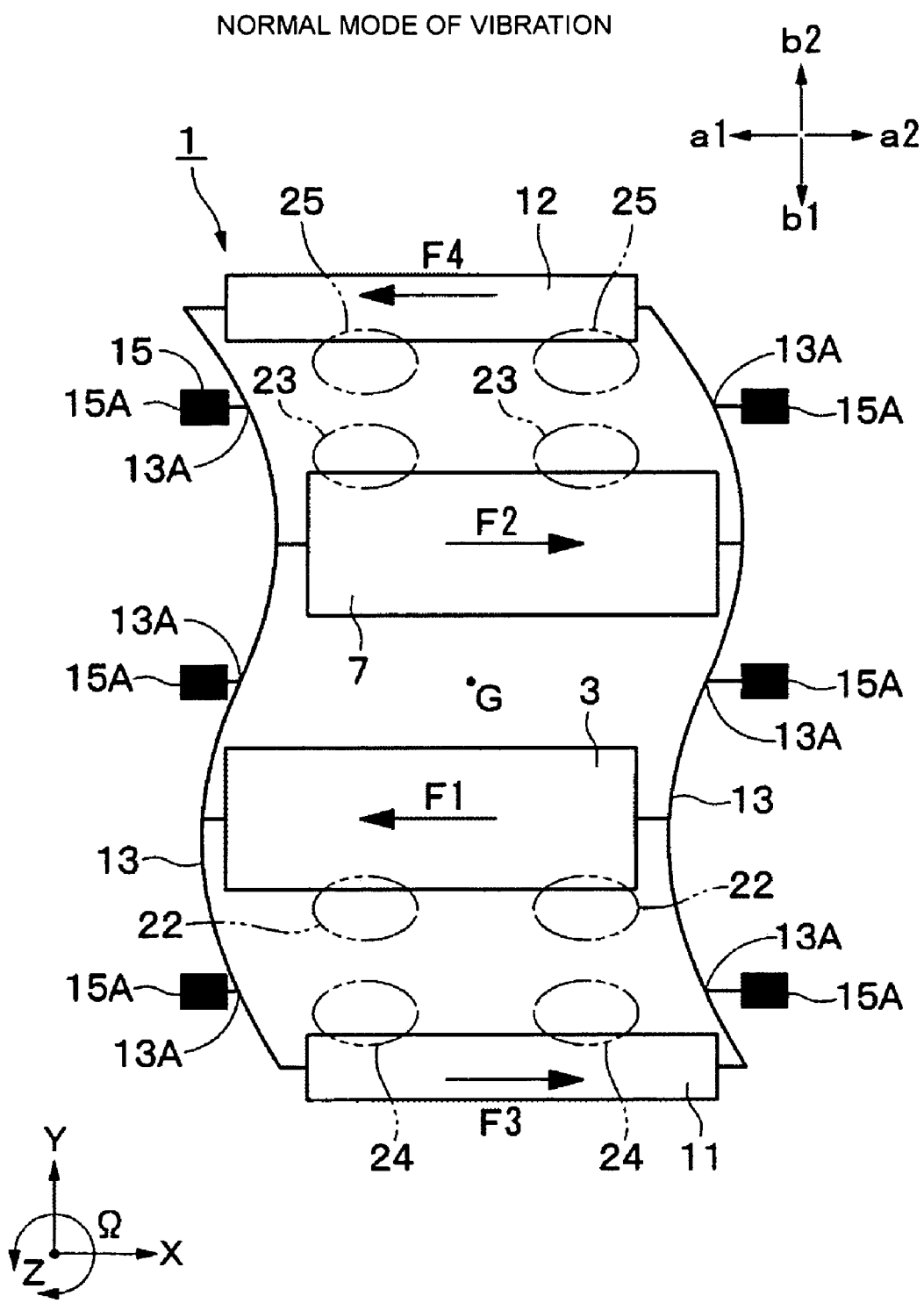
FIG. 2 illustrates a state in which mass portions vibrate in the normal vibration mode.

FIGS. 1 and 2 illustrate a first preferred embodiment. In the present preferred embodiment, an angular rate sensor detecting an angular rate about the Z-axis perpendicular to a substrate will be described by way of example.

An angular-rate sensor 1 includes a substrate 2 defining a base thereof. The substrate 2 is preferably made of material such as silicon, glass, or other suitable material in a flat shape and is disposed, for example, so as to extend substantially parallel to the X and Y axes and also to be substantially perpendicular to the Z-axis, of the X, Y, and Z axes being perpendicular to one another.

The substrate 2 includes first and second central mass portions 3 and 7, first and second outer mass portions 11 and 12, inner support beams 6 and 10, outer support beams 13, a fixing portion 15, fixed drive electrodes 16 and 17, movable drive electrodes 18 to 21, fixed detection-electrodes 26 and 27, movable detection-electrodes 28 and 29, vibration monitors 34, and other suitable elements, which will be described later, provided thereon, for example, by applying an etching process on a conductive, low-resistance silicon material.

Of the four mass portions 3, 7, 11, and 12 juxtaposed to one another in the Y-axis direction, the first central mass portion 3 is disposed near the center of the substrate 2 together with the second central mass portion 7. Also, the central mass portion 3 is defined by a quadrangular outer frame 4, a quadrangular inner frame 5 disposed inside the outer frame 4, and, for example, four pieces of the inner support beams 6 disposed between the four corners of the inner frame 5 and the outer frame 4.

Meanwhile, the outer frame 4 prevents displacement of the outer support beams 13, which will be described later, so as to be deformed and consequently displaced in the Y-axis direction (detection direction) when the central mass portion 3 vibrates in the X-axis direction (vibration direction) from being transferred to the inner frame 5. Also, the inner support beams 6 extend in the X-axis direction so as to be deformable in the Y-axis direction and support the inner frame 5 so as to be displaceable in the Y-axis direction and prevent the inner frame 5 from being displaced in the X-axis direction.

In substantially the same manner as the central mass portion 3, the second central mass portion 7 is defined by an outer frame 8, an inner frame 9, and the inner support beams 10 corresponding to the inner support beams 6. The inner frame 9 is displaceable in the Y-axis direction in accordance with deformation of each inner support beam 10.

The first and second outer mass portions 11 and 12 are disposed outside the central mass portions 3 and 7, respectively, with respect to the Y axis direction. Each of the outer mass portions 11 and 12 is arranged to define a linearly shaped mass body extending in the X-axis direction, and both ends thereof in the longitudinal direction are connected to the corresponding outer support beams 13.

The right and left outer support beams 13 are disposed on both sides of the substrate in the X-axis direction so as to sandwich the mass portions 3, 7, 11, and 12, and each outer support beam 13 is arranged to define an elastic narrow beam, to extend linearly in the Y-axis direction and also to be deformable in the X-axis direction. The outer frames 4 and 8 of the mass portions 3 and 7 are connected to longitudinal middle portions of the outer support beam 13, having wide connecting portions 14 with high stiffness interposed therebetween, in addition to having the outer mass portions 11 and 12 connected to both ends thereof in the longitudinal direction.

With this configuration, the four mass portions 3, 7, 11, and 12 are supported by the outer support beams 13 so as to be vibratable in the X-axis direction and being disposed linearly juxtaposed to one another in the Y-axis direction. Also, these mass portions 3, 7, 11, and 12 are substantially symmetrically disposed with respect to the center of gravity G of the overall mass portions.

Thus, when a drive signal is applied on each of individual vibration generators 22 to 25, which will be described later, as shown in FIG. 2, the mass portions 3 and 11 adjacent to each other and the mass portions 7 and 12 adjacent to each other vibrate in the X-axis direction in opposite phases (180° out of phase) while maintaining the center of gravity G of the overall mass portions at a substantially constant position. In other words, for example, when the mass portions 3 and 12 vibrate in the direction of arrow a1 of the X-axis direction, the mass portions 7 and 11 vibrate in the arrow a2 direction indicating the reverse direction to the arrow a1.

The mode of vibration as described above in which two of the mass portions adjacent to each other vibrate in opposite phases is previously defined as the normal mode of vibration when the angular rate sensor 1 is in operation. In this mode of vibration, since the mass portions 3 and 11 and the mass portions 7 and 12 vibrate stably in a symmetrical manner with respect to the center of gravity G and also vibrate around the center of gravity G in a well balanced manner, the vibration of each mass portion is prevented from being transferred to the substrate 2. Also, in the normal vibration mode, each outer support beam 13 vibrates in a snake-like manner while being deformed in the X-axis direction in a substantially S-shape and has, for example, three pieces of node portions 13A disposed at longitudinal middle portions thereof, each defining a node of vibration and staying at a substantially constant position.

The fixing portion 15 disposed on the substrate 2 is defined by quadrangular mounts 15A fixed on the substrate 2 so as to surround the mass portions 3, 7, 11, and 12, substantially T-shaped extending portions 15B disposed on the right and left sides of the substrate 2 and inside and integrally with the mounts 15A, and extending in the Y-axis direction, and three pieces of, for example, substantially C-shaped or U-shaped elastic arms 15C disposed on each extending portion 15B and connected to the corresponding node portions 13A of each outer support beam 13 so as to be spaced away from the substrate 2.

Meanwhile, the arms 15C hold the mass portions 3, 7, 11, and 12, the support beams 6, 10, and 13, and the movable electrodes 18 to 21, 28, and 29 so as to be spaced away from the substrate 2. In this case, since the arms 15C support each mass portion at the node portions 13A (nodes of vibration) of the outer support beams 13, the vibration of each of these components is cancelled out at the node portions 13A and is therefore prevented from being transferred to the substrate 2. With this structure, when the displacement of each of the inner frames 5 and 9 of the central mass portions 3 and 7 displaced in the Y-axis direction in accordance with an angular rate Ω about the Z-axis is detected as the angular rate Ω, deterioration in detection accuracy due to the vibration of the substrate 2 is effectively prevented.

Subsequently, a mechanism for driving the mass portions 3, 7, 11, and 12 will be described. For example, two pieces of the fixed drive electrodes, that is, the two fixed drive electrodes 16, are disposed on the substrate 2, and each fixed drive electrode 16 is defined by, for example, a comb-shaped electrode and includes a plurality of electrode plates 16A and 16B, and these drive electrodes 16 are disposed between the first central mass portion 3 and the outer mass portion 11, having a space therebetween in the X-axis direction. In this case, each electrode plate 16A is arranged so as to face the central mass portion 3, and each electrode plate 16B is arranged so as to face the outer mass portion 11. Also, these electrode plates 16A and 16B are disposed side by side in a comb shaped configuration, have spaces in the Y-axis direction, and extend in the X-axis direction.

Also, two other pieces of fixed drive electrodes, that is, the two fixed drive electrodes 17 are disposed between the second central mass portion 7 and the outer mass portion 12, having a space therebetween in the X-axis direction, and each fixed drive electrode 17 includes a plurality of electrode plates 17A arranged so as to face the central mass portion 7 and a plurality of electrode plates 17B arranged so as to face the outer mass portion 12.

The movable drive electrodes 18 corresponding to the respective fixed drive electrodes 16 are disposed on the outer frame 4 of the first central mass portion 3, and each movable drive electrode 18 is defined by, for example, a comb shape electrode and includes a plurality of electrode plates 18A engaging with the corresponding electrode plates 16A of the fixed drive electrodes 16, each pair of electrode plates having a gap therebetween in the Y-axis direction.

Also, the movable drive electrodes 19 corresponding to the respective fixed drive electrodes 17 are disposed on the outer frame 8 of the second central mass portion 7, each having electrode plates 19A engaging with the respective electrode plates 17A of the corresponding fixed drive electrode 17. In addition, the movable drive electrodes 20 and 21 are likewise disposed on the outer mass portions 11 and 12, respectively, each pair having a space therebetween in the right and left direction. Each movable drive electrode 20 includes electrode plates 20A engaging with the respective electrode plates 16B of the corresponding fixed drive electrode 16, and each movable drive electrode 21 includes electrode plates 21A engaging with the respective electrode plates 17B of the corresponding fixed drive electrode 17.

The pair of right and left individual vibration generators 22 are disposed on the first central mass portion 3, each pair having a space therebetween in the X-axis direction, and each individual vibration generator 22 is defined by the electrode plates 16A of the corresponding fixed drive electrode 16 and the electrode plates 18A of the corresponding movable drive electrode 18.

The pair of right and left individual vibration generators 23 are disposed on the second central mass portion 7, and each individual vibration generator 23 is defined by the electrode plates 17A of the corresponding fixed drive electrode 17 and the electrode plate 19A of the corresponding movable drive electrodes 19. Also, the pair of right and left vibration generators 24 are disposed on the first outer mass portion 11, and each individual vibration generator 24 is defined by the electrode plates 16B of the corresponding fixed drive electrode 16 and the electrode plates 20A of the corresponding movable drive electrodes 20. In addition, the pair of right and left vibration generators 25 are disposed on the second outer mass portion 12, and each individual vibration generator 25 is defined by the electrode plates 17B of the corresponding fixed drive electrode 17 and the electrode plates 21A of the corresponding movable drive electrode 21.

As described above, in the present preferred embodiment, as shown in FIG. 2, the mass portions 3, 7, 11, and 12 have the corresponding individual vibration generators 22 to 25 disposed thereon and are vibrated in accordance with electrostatic forces (drive forces) F1 to F4 generated by the corresponding individual vibration generators 22 to 25 so as to vibrate each mass portion.

In this case, when drive signals having opposite phases are applied on the pair of right and left individual vibration generators 22 (the pair of right and left fixed drive electrodes 16), for example, from a control circuit (not shown) of the sensor, electrostatic drive forces are generated in the pair of right and left fixed drive electrodes 16 (the respective electrode plates 16A) and movable drive electrodes 18 (the respective electrode plates 18A) in FIG. 2, thereby causing the central mass portion 3 to vibrate in the arrow a1 and a2 directions indicated in FIG. 2. On this occasion, drive signals in phase with those applied on the pair of left and right individual vibration generators 22 are applied on the pair of right and left individual vibration generators 23 (the pair of right and left fixed drive electrodes 17). With this arrangement, the mass portions 3 and 7 have drives forces exerted thereon in opposite directions from each other (for example, drive forces F1 and F2 exerted thereon in the arrow z1 and a2 directions indicated in FIG. 2).

In the mean time, the comb-shaped electrodes of the individual vibration generators 22 and 24 are arranged so as to extend in opposite directions from each other with respect to the X-axis direction, and also the comb-shaped electrodes of the individual vibration generators 23 and 25 are arranged so as to extend in opposite directions from each other, with respect to the X-axis direction. That is, the electrode plates 16A and 18A and the electrode plates 17B and 21A respectively defining the individual vibration generators 22 and 25 extend in the opposite direction, with respect to the X-axis direction, from that in which the electrode plates 17A and 19A and the electrode plates 16B and 20A respectively defining the individual vibration generators 23 and 24 extend. With this structure, for example, when the drive forces F1 and F2 are respectively exerted on the mass portions 3 and 12 in the direction of arrow a1 indicated in FIG. 2 by the individual vibration generators 22 and 25, the drive forces F2 and F3 are respectively exerted on the mass portions 7 and 11 in the direction of arrow a2 indicated in FIG. 2 by the individual vibration generators 23 and 24. As a result, the drive forces F1 and F4 and the drive forces F2 and F3 act in the opposite directions from each other with respect to the X-axis direction (act in opposite phases).

With this arrangement, in the present preferred embodiment, phases of the mass portions 3, 7, 11, and 12 are individually set by the individual vibration generators 22 to 25 so as to forcibly excite the normal vibration mode in which two of the mass portions adjacent to each other vibrate in opposite phases.

Meanwhile, the drive forces F1 to F4 generated by the individual vibration generators 22 to 25 are previously set so as to satisfy Expression 1 shown below in association with masses m1 to m4 of the mass portions 3, 7, 11, and 12, and driven amplitudes A1 to A4 of the vibrating mass portions.

$$F1:F2:F3:F4 = m1 \times A1 : m2 \times A2 : m3 \times A3 : m4 \times A4 \quad \text{Expression 1:}$$

In other words, the ratio (mi×Ai/Fi) of the product (mi× Ai) of a mass mi and a driven amplitude Ai of a mass portion in question to a drive force Fi exerted on the mass portion by the corresponding one of the individual vibration generators 22 to 25 is set so as to be substantially the same among the mass portions 3, 7, 11, and 12 (where, i=1, 2, 3, 4). As a result, the normal vibration mode is effectively excited.

Subsequently, a mechanism for detecting an angular rate will be described. The fixed detection electrodes 26 and 27 are disposed on the substrate 2 and defined by, for example, comb-shaped electrodes. The fixed detection electrode 26 includes a plurality of electrode plates 26A extending in the X-axis direction with respective spaces in the Y-axis direction and is disposed in the inner frame 5 of the first central mass portion 3. Also, the fixed detection electrode 27 includes electrode plates 27A substantially the same as the detection electrode 26 and is disposed in the inner frame 9 of the second central mass portion 7.

The movable detection electrode 28 is disposed on the inner frame 5 of the central mass portion 3 so as to correspond to the fixed detection electrode 26. The movable detection electrode 28 includes a plurality of electrode plates 28A engaged with the respective electrode plates 26A of the fixed detection electrode 26, each pair of electrode plates having a gap therebetween in the Y-axis direction. Also, the movable detection electrode 29 is disposed on the inner frame 9 of the central mass portion 7 so as to correspond to the fixed detection electrode 27 and includes electrode plates 29A engaging with the respective electrode plates 27A of the fixed detection electrode 27, each pair of electrode plates having a gap therebetween in the Y-axis direction.

A first angular rate detector 30 is disposed on the central mass portion 3 and is defined by the fixed detection electrode 26 and the movable detection electrode 28, and the electrode plates 26A and 28A thereof are arranged so as to define plane parallel capacitors. When the first central mass portion 3 is displaced in the Y-axis direction due to its angular rate $\Omega$ about the Z-axis, the angular rate detector 30 detects the displacement as the angular rate $\Omega$ on the basis of a variance in capacitance between the detection electrodes 26 and 28.

A second angular rate detector 31 is disposed on the central mass portion 7 and is defined by the fixed detection electrode 27 and the movable detection electrode 29. When the second central mass portion 7 is displaced in the Y-axis direction due to its angular rate $\Omega$, the angular rate detector 31 detects the displacement as the angular rate $\Omega$ on the basis of a variance in capacitance between the detection electrodes 27 and 29.

Meanwhile, in the first angular rate detector 30, for example, when the inner frame 5 of the central mass portion 3 is displaced in the direction of arrows b1 or b2 indicated in FIG. 2 with respect to the Y-axis direction, the capacitance between the detection electrodes 26 and 28 increases or decreases, respectively. On the contrary, in the second angular rate detector 31, for example, when the inner frame 9 of the central mass portion 7 is displaced in the direction of arrows b1 or b2 indicated in the FIG. 2, the capacitance between the detection electrodes 27 and 29 decreases or increases, respectively.

Fixed monitor electrodes 32 are disposed on the substrate 2, in the vicinities of the outer mass portions 11 and 12. Each fixed monitor electrode 32 is defined by, for example, a comb-shaped electrode and engages with a comb-shaped movable monitor electrode 33 disposed on the corresponding one of the outer mass portions 11 and 12, each pair of electrodes having a gap therebetween.

Vibration monitors 34 are respectively disposed on the outer mass portions 11 and 12. Each vibration monitors 34 is defined by the fixed monitor electrodes 32 and the movable monitor electrodes 33 and monitors vibrating states of the outer mass portions 11 and 12 so as to feed back a drive signal for being controlled by the control circuit of the sensor.

Subsequently, an operation of the angular rate sensor 1 having the above-described structure according to the present preferred embodiment will be described.

For example, when alternating-current drive signals in opposite phases are applied on the pair of right and left individual vibration generators 22 (the pair of right and left fixed drive electrodes 16) together with direct-current bias voltages from the control circuit of the sensor, electrostatic drive forces are generated in the pairs of right and left fixed drive electrodes 16 (the respective electrode plates 16A) and movable drive electrodes 18 (the respective electrode plates 18A) in turn, thereby causing the central mass portion 3 to vibrate in the directions of arrow a1 and a2 indicated in FIG. 2. On this occasion, drive signals in phase with those applied on the pair of left and right individual vibration generators 22 are applied on the pair of right and left individual vibration generators 23 (the pair of right and left fixed drive electrodes 17) respectively. With this arrangement, drive forces are exerted on the mass portions 3 and 7 in the opposite directions to each other (for example, the drive forces F1 and F2 in the directions of arrow a1 and a2 indicated in FIG. 2).

In the meantime, the comb-shaped electrodes of the individual vibration generators 22 and 24 are arranged so as to extend in the opposite directions from each other with respect to the X-axis direction, and also the comb-shaped electrodes of the individual vibration generators 23 and 25 are arranged so as to extend in the opposite directions from each other, with respect to the X-axis direction. With this structure, drive forces are exerted on the mass portions 7 and 11 in the opposite directions from that of the mass portions 3 and 12 (for example, the drive forces F2 and F3 in the opposite directions from that of the drive forces F1 and F4).

As a result, for example, when the drive forces F1 and F4 are respectively exerted on the mass portions 3 and 12 in the direction of arrow a1 indicated in FIG. 2 by individual vibration generators 22 and 25, the drive forces F2 and F3 are respectively exerted on the mass portions 7 and 11 in the opposite direction (in the direction of arrow a2 indicated in FIG. 2) by the individual vibration generators 23 and 24. With this arrangement, the pairs of the mass portions 3 and 11 and the mass portions 7 and 12 vibrate in opposite phases while maintaining the center of gravity G of these mass portions at a substantially constant position. Since the two pairs of mass portions vibrate while lying symmetrically with respect to the center of gravity G, these mass portions vibrate in a well-balanced manner.

Figure 3:
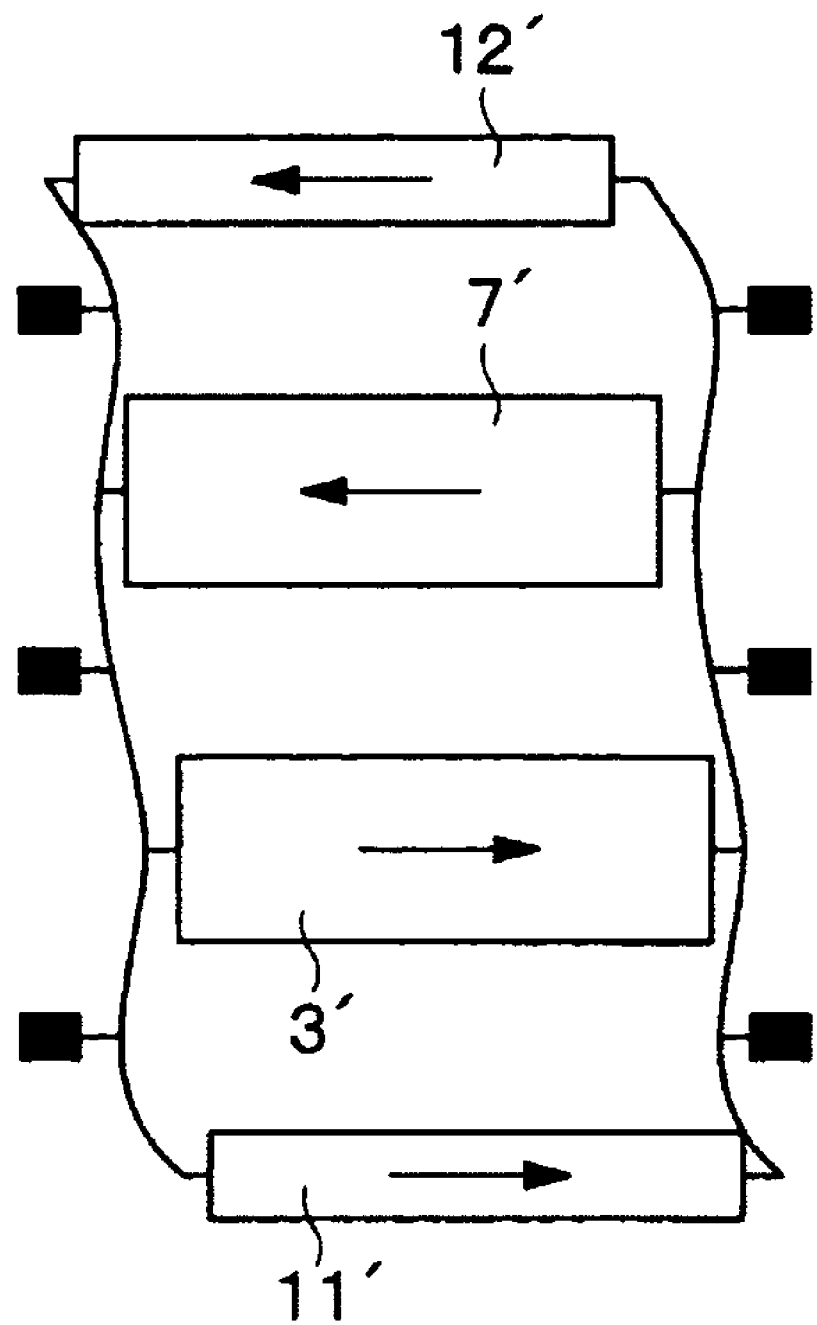
FIG. 3 illustrates Comparative Example 1 having a vibration mode that is different from the normal vibration mode.
Figure 4:
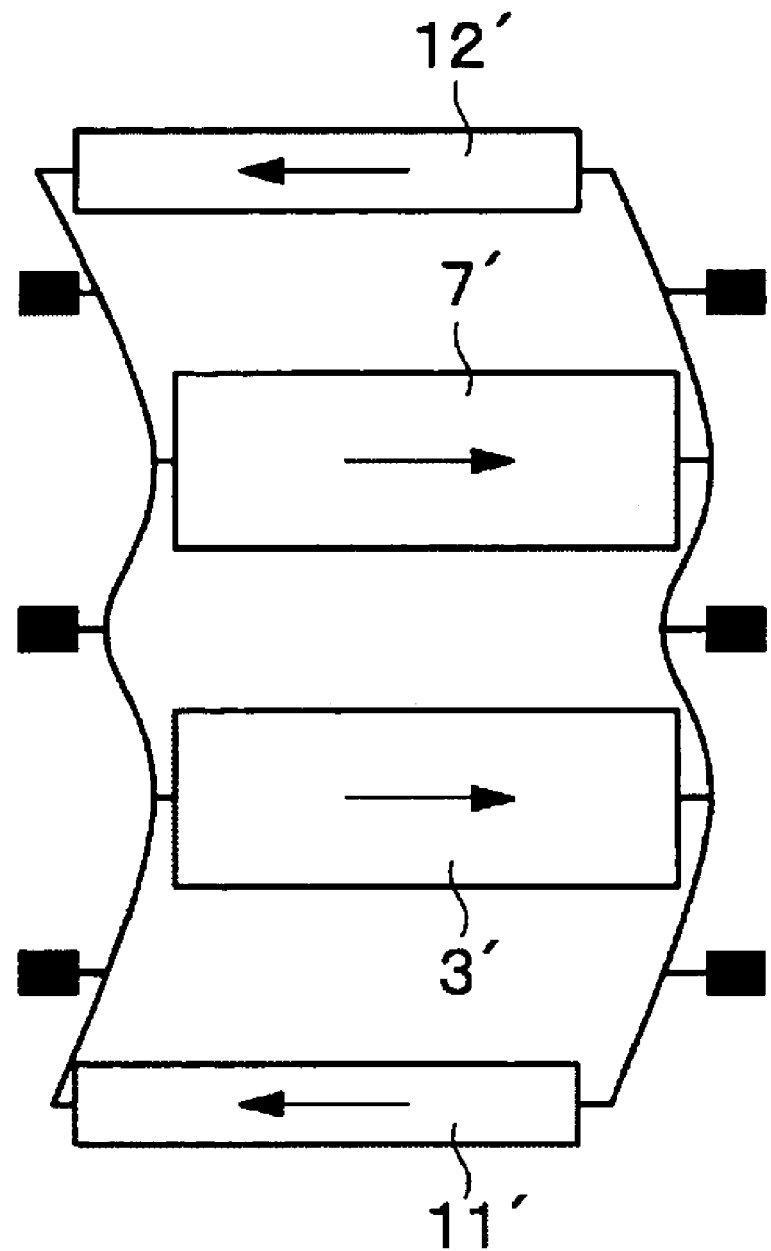
FIG. 4 illustrates Comparative Example 2 having a vibration mode that is different from the normal vibration mode.
Figure 5:
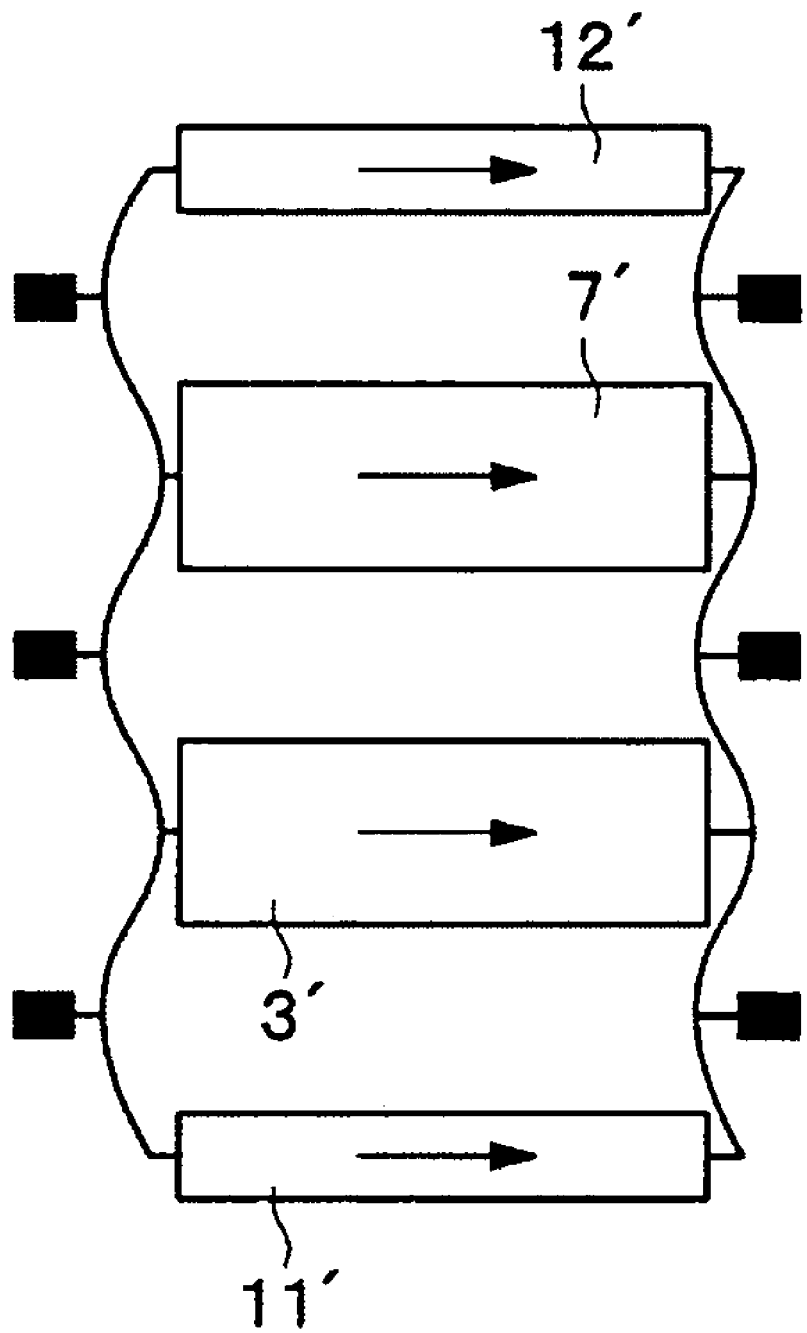
FIG. 5 illustrates Comparative Example 3 having a vibration mode that is different from the normal vibration mode.

Meanwhile, vibrating states of the mass portions 3, 7, 11, and 12 include not only the normal vibration mode as shown in FIG. 2, in which two of the mass portions adjacent to each other vibrate in opposite phases, but also vibration modes different from the normal vibration mode, for example, in Comparative Examples 1 to 3 as shown in FIGS. 3 to 5. In a case of a vibrating state different from the normal vibration mode, in the vibration mode in Comparative Example 1, for example, a pair of mass portions 3' and 11' and another pair of mass portions 7' and 12' vibrate respectively in phase with each other. Also, in the vibration mode in Comparative Example 2, a pair of the central mass portions 3' and 7' and another pair of the outer mass portions 11' and 12' vibrate respectively in phase with each other. In addition, in the vibration mode in Comparative Example 3, all mass portions 3', 7', 11', and 12' vibrate in phase with one another.

Of the normal vibration mode and vibration modes other than the normal vibration mode as mentioned above, a vibration mode which is likely to be actually excited is determined in accordance with, for example, a displaced state of each mass portion when the mass portion is statically displaced with a predetermined external force (drive force) (hereinafter, referred to as a displaced state of the mass portion due to a static drive force), a phase and a magnitude of a drive signal Vd, a Q value of the vibration characteristic of the mass portion, and so forth.

In this case, in the present preferred embodiment, since the four mass portions 3, 7, 11, and 12 have the corresponding individual vibration generators 22 to 25 disposed thereon, two of the mass portions adjacent to each other are forcibly vibrated in opposite phases by these the individual vibration generators 22 to 25, thereby reliably preventing the mass portions from vibrating in a vibration mode other than the normal vibration mode.

Also, the normal vibration mode is effectively excited when a displaced state (a displaced shape) of each mass portion due to a static drive force is analogous to that of the mass portion in the normal vibration mode since vibration energy is most effectively transferred.

Figure 6:
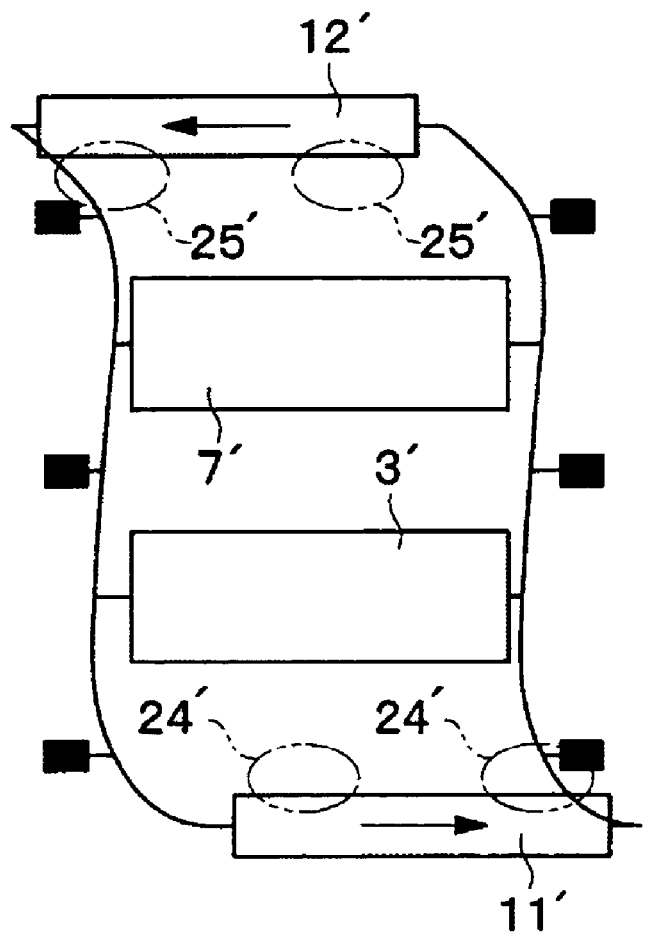
FIG. 6 illustrates Comparative Example 4 in which each mass portion is displaced due to a static drive force when only outer mass portions are driven.

Hence, when only the outer mass portions 11' and 12' are driven by vibration generators 24' and 25' as, for example, in Comparative Example 4 illustrated in FIG. 6, displaced states of the mass portions due to static forces are different from those of the mass portions in the normal vibration mode (see FIG. 2), thereby decreasing excitation efficiency of the normal vibration mode.

That is, with respect to static displaced states of the respective mass portions in this comparative example, since the displacements of the outer mass portions 11' and 12' increase, and those of the central mass portions 3' and 7' decrease, such a structure causes problems in that, for example, the startup time from startup of the sensor 1 to excitation of the normal vibration mode increases, and a vibration mode other than the normal mode of vibration is likely excited when a signal level (voltage) of a drive signal is low.

On the contrary, in the present preferred embodiment, since the ratio among the drive forces F1 to F4 exerted on the mass portions 3, 7, 11, and 12 is appropriately set as given by the foregoing Expression 1, the normal vibration mode is effectively excited. In other words, when each mass portion is vibrating, an inertia force Pi exerted on each vibrating mass portion is given by Expression 2 shown below by using a mass mi, a driven amplitude Ai, and an angular vibration frequency ω of the mass portion (where, i=1, 2, 3, 4).

$$P_i = -m_i \times A_i \times \omega^2 \times \sin \omega t \qquad \text{Expression 2:}$$

When the mass portion is at maximum displacement (maximum vibration) in the X-axis direction, the maximum inertia force $P_i'(=-m_i \times A_i \times \omega^2)$ exerted on the corresponding mass portion is equivalent to a spring force of the outer support beams 13 exerted on the mass portion. Thus, by making the ratio among the drive forces F1 to F4 exerted on the mass portions 3, 7, 11, and 12 equal to that among the maximum inertia forces $P_i'$ exerted on the respective mass portions, displaced states of each mass portion due to a static drive force and in the normal vibration mode is set so as to be the same as each other, thereby increasing excitation efficiency of the normal mode of vibration of the mass portions 3, 7, 11, and 12. In this case, the ratio among the drive forces F1 to F4 is set at a desired value by appropriately adjusting, for example, the numbers, shapes, facing areas of the mutually opposing electrodes, and so forth of the drive electrodes 16 to 21.

Subsequently, an operation of the sensor 1 for detecting an angular rate will be described. When a torque is applied on the substrate 2 so as to be rotated at an angular rate Ω about the Z-axis in a state in which the mass portions 3, 7, 11, and 12 are vibrating, the one mass portion 3 of the central mass portions 3 and 7 is subjected to a Coriolis force Fc in the Y-axis direction given by Expression 3 shown below. Accordingly, since the inner support beams 6 are deformed, the inner frame 5 of the central mass portion 3 is displaced in the arrow b1 direction indicated in the figure, for example, in accordance with the Coriolis force Fc.

$$F_c = 2 \times m \times \Omega \times v \qquad \text{Expression 3:}$$

where m is a mass of the inner frame 5, Ω is an angular rate about the Z-axis, and v is a rate of the inner frame 5 in the X-axis direction.

Also, because of being vibrating in an opposite phase as the central mass portion 3 (at a rate in the opposite direction from that of the central mass portion 3), the other central mass portion 7 is subjected to the Coriolis force Fc in the opposite direction from that of the central mass portion 3 (that is, is subjected to −Fc), the inner frame 9 of the central mass portion 7 is displaced in the direction of arrow b2 indicated in FIG. 2. Resultantly, since respective capacitances of the angular rate detectors 30 and 31 increase, variances in these capacitances can be detected as the angular rate Ω about the Z-axis Ω.

As described above, according to the present preferred embodiment, the individual vibration generators 22 to 25 are respectively disposed on the mass portions 3, 7, 11, and 12 so as to exert the drive forces F1 and F3 on the mass portions 3 and 11 adjacent to each other in the opposite directions from each other and the drive forces F2 and F4 on the mass portions 7 and 12 adjacent to each other in the opposite directions from each other.

With these drive forces F1 to F4, the individual vibration generators 22 to 25 forcibly vibrate the mass portions 3 and 11 adjacent to each other and the mass portions 7 and 12 adjacent to each other in opposite phases, thereby reliably and easily exciting the normal mode of vibration. As a result, without excessively increasing the magnitudes of the drive forces F1 to F4 (drive signals), for example, at the time of starting up the angular rate sensor 1, the normal vibration mode is effectively excited upon startup of the individual vibration generators 22 to 25, and the period of the startup time is reduced while inhibiting the power consumption of the sensor 1.

Also, problems in which no normal vibration mode of vibration is excited and a vibration mode other than the normal vibration mode is excited are reliably prevented, and the normal vibration mode excited is easily maintained. Accordingly, the performances of the sensor 1 is stabilized, and thus, its incorrect operation is prevented, thereby accurately detecting an angular rate and improving detection accuracy and reliability.

In this case, as shown in the foregoing Expression 1, since the ratio among the drive forces F1 to F4 exerted on the corresponding mass portions 3, 7, 11, and 12 is set so as to be the same as the ratio among the products $(m_i \times A_i)$ of a mass mi and a driven amplitude Ai of the respective mass portions (where, i=1, 2, 3, 4), a displaced state of each of the mass portions 3, 7, 11, and 12 caused by a static drive force is made substantially the same as a vibrating state of the mass portion in the normal vibration mode, thereby improving excitation efficiency of the normal vibration mode.

Also, since the ratio among the drive forces F1 to F4 is appropriately set, a predetermined drive signal (drive voltage) causes each of the mass portions 3, 7, 11, and 12 having, for example, a predetermined Q value to produce a large amplitude, thereby improving excitation efficiency of the normal mode up to close to the maximum level and also improving detection sensitivity.

Also, by inhibiting excitation of a vibration mode other than the normal vibration mode, a vibration mode (detection mode) is also prevented from being excited, for example, in the detection direction (Y-axis direction). With this arrangement, the mass portions 3, 7, 11, and 12 are prevented from being displaced in the detection direction independently of an angular rate, which causes generation of noises in a detection signal, drift of the detection signal, and other adverse conditions, thereby leading to a stable detection operation.

In the meantime, since the four mass portions 3, 7, 11, and 12 are linearly juxtaposed to one another, these mass portions are symmetrically arranged with respect to the center of gravity G of the overall mass portions, whereby each of the mass portions 3, 7, 11, and 12 vibrates stably in reverse phase with mass portions adjacent thereto while maintaining the center of gravity G of the overall mass portions at a substantially constant location. Also, even when each mass portion has, for example, a slight dimensional or manufacturing error, a difference in resonant frequencies caused by the error is compensated by the symmetrical geometry.

With this structure, by vibrating the pair of the central mass portions 3 and 7 (or the pair of the outer mass portions 11 and 12) in opposite phases in a well-balanced manner, reaction forces thereof at the time of vibration canceled each other out, thereby reliably inhibiting the vibration thereof from being transferred to the substrate 2. Accordingly, when the displacement of each of the inner frames 5 and 9 of the central mass portions 3 and 7 in the Y-axis direction is detected as an angular rate Ω, deterioration in detection accuracy caused by vibration of the substrate 2 is prevented, and as a result, the angular rate is accurately detected.

Figure 7:
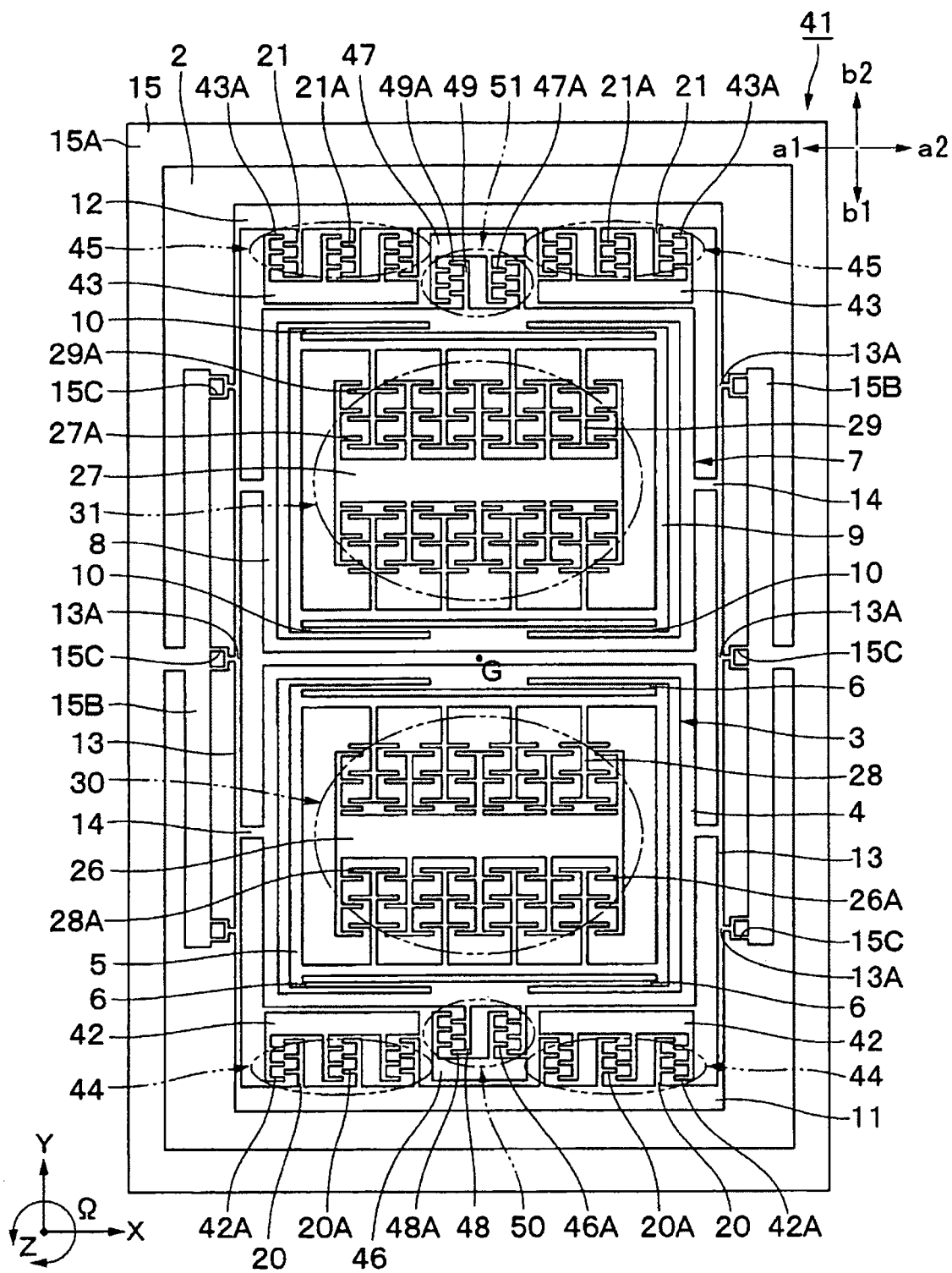
FIG. 7 is a plan view of an angular rate sensor according to a second preferred embodiment of the present invention.
Figure 8:
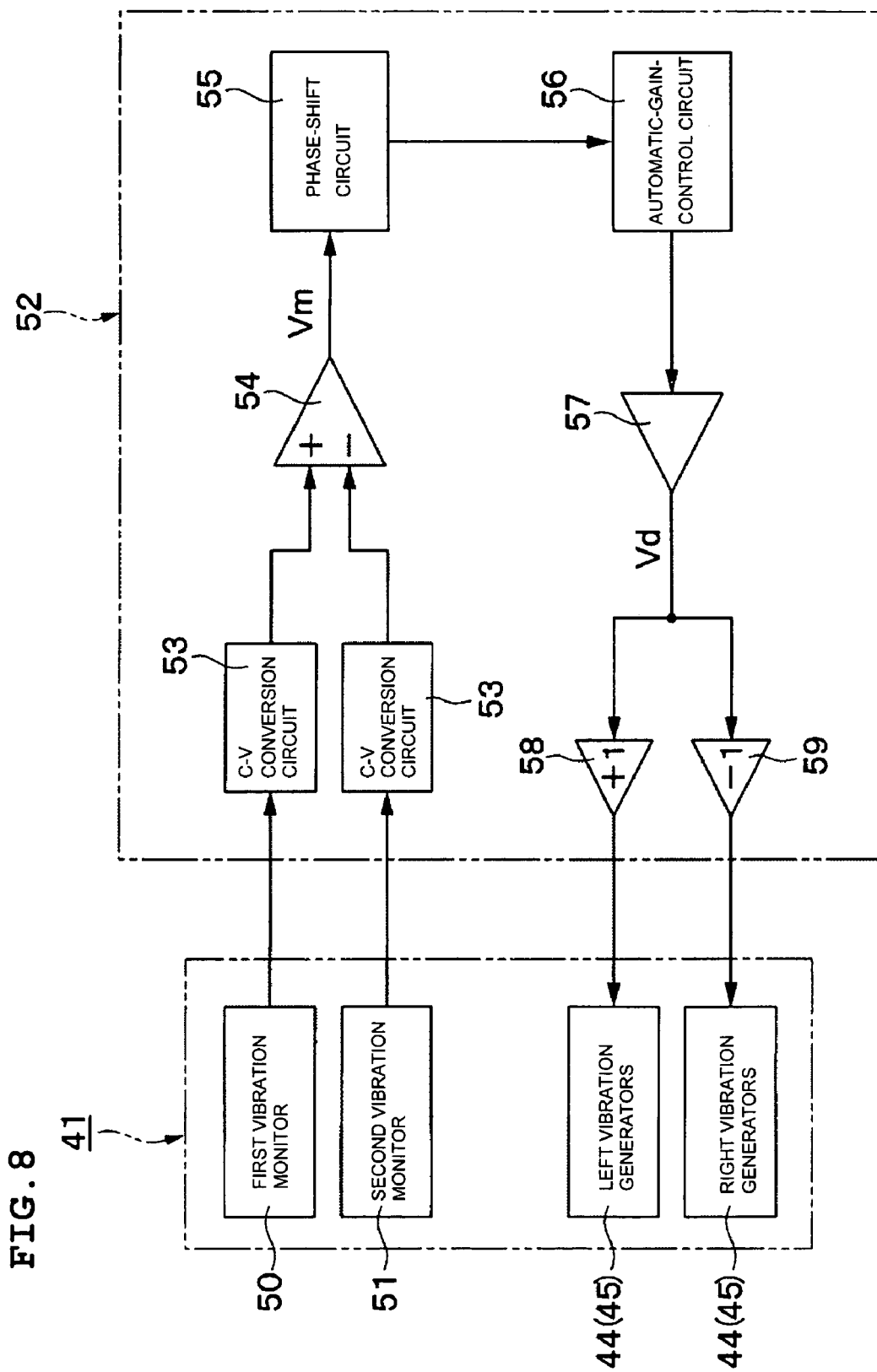
FIG. 8 illustrates the structure of a control circuit of the angular rate sensor.
Figure 9:
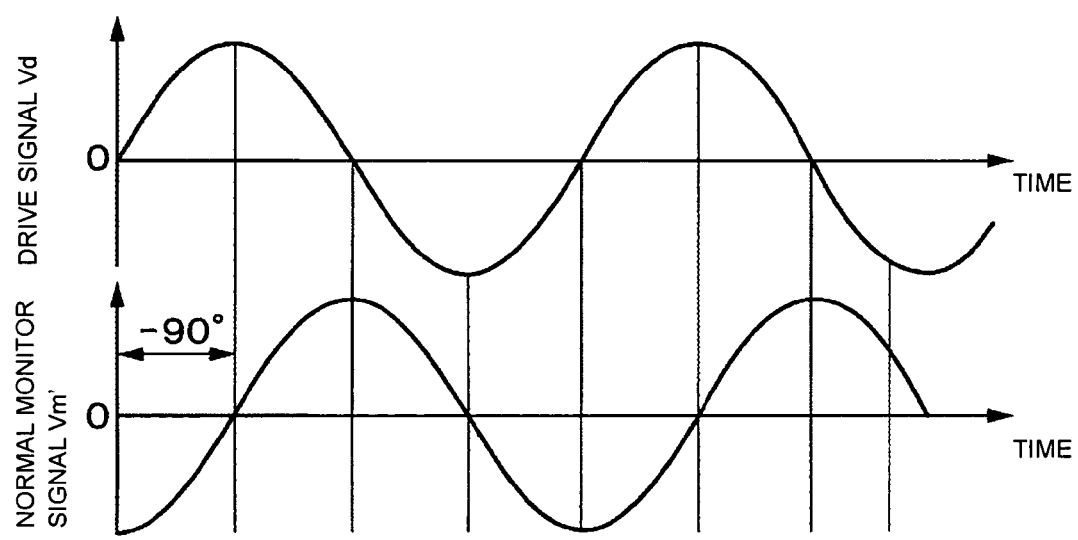
FIG. 9 is a characteristic diagram illustrating the relationship between drive signal and normal monitor signal when the mass portions vibrate in the normal vibration mode.

FIGS. 7 to 9 illustrate a second preferred embodiment of the present invention. The present preferred embodiment includes a portion of the mass portions having vibration generators disposed thereon, and other mass portions being adjacent to the portion of the mass portions have vibration monitors disposed thereon. Meanwhile, in the present preferred embodiment, the like elements are identified by the same reference numbers as those in the first preferred embodiment, and the descriptions thereof are omitted.

An angular rate sensor 41 is defined by the substrate 2, the mass portions 3, 7, 11, and 12, the support beams 6, 10, and 13, the fixing portion 15, the drive electrodes 20 and 21, and the detection-electrodes 26 to 29. However, the central mass portions 3 and 7 have no vibration generators disposed thereon, but instead have vibration monitors 50 and 51 respectively disposed thereon, which will be described later.

For example, two pieces of fixed drive electrodes 42 are disposed on the substrate 2. Although each fixed drive electrode 42 is defined as, for example, a comb-shaped electrode including a plurality of electrode plates 42A in substantially the same manner as in the first preferred embodiment, the drive electrodes 42 are configured such that the electrode plates 16A close to the central mass portion 3 are eliminated from the fixed drive electrodes 16 disposed in the first preferred embodiment. Also, the substrate 2 includes two additional fixed drive electrodes 43 disposed thereon, each having a plurality of electrode plates 43A and being configured such that electrode plates 17A close to the central mass portion 7 are eliminated from the fixed drive electrodes 17 disposed in the first preferred embodiment.

Right and left vibration generators 44 are disposed on the first outer mass portion 11. In substantially the same manner as in the first preferred embodiment, each vibration generator 44 is defined by the electrode plates 42A of the fixed drive electrodes 42 and the electrode plates 20A of the movable drive electrodes 20. Also, right and left vibration generators 45 are disposed on the second outer mass portion 12. Each vibration generator 45 is defined by the electrode plates 43A of the fixed drive electrodes 43 and the electrode plates 21A of the movable drive electrodes 21.

The vibration generators 44 and 45 generate electrostatic drive forces when drive signals Vd are applied thereto from a control circuit 52, which will be described later, and respectively cause the outer mass portions 11 and 12 to vibrate in the X-axis direction with these drive forces. In this case, for example, when the vibration generators 44 generate drive forces F3' in the direction of arrow a2 indicated in FIG. 7, the vibration generators 45 generate a drive forces F4' in the direction of arrow a1 indicated in FIG. 7, which is opposite to the direction of arrow a2.

Fixed monitor electrodes 46 and 47 are disposed on the substrate 2, in the vicinities of the central mass portions 3 and 7, respectively. These fixed monitor electrodes 46 and 47 are defined by, for example, comb-shaped electrodes and include a plurality of electrode plates 46A and 47A extending in the X-axis direction while having respective spaces in the Y-direction.

The electrode plates 46A of the fixed monitor electrode 46 engage with respective electrode plates 48A of a movable monitor electrode 48 disposed on the central mass portion 3, each pair of electrode plates having a gap therebetween in the Y-axis direction, and the electrode plates 47A of the fixed monitor electrode 47 engage with respective electrode plates 49A of a movable monitor electrode 49 disposed on the central mass portion 7.

A first vibration monitor 50 monitors a vibrating state of the central mass portion 3 and is defined by the fixed monitor electrode 46 and the movable monitor electrode 48. That is, the first vibration monitor 50 detects the vibrating state of the central mass portion 3 on the basis of a variance in capacitance between the monitor electrodes 46 and 48 and outputs a monitor signal Vm via a C-V conversion circuit 53, which will be described later. Also, a second vibration monitor 51 monitors a vibrating state of the central mass portion 7 and is defined by the fixed monitor electrode 47 and the movable monitor electrode 49. Upon detecting the vibrating state of the central mass portion 7, the second vibration monitor 51 outputs a monitor signal Vm via another C-V conversion circuit 53, which will be described later.

As described above, in the present preferred embodiment, the vibration generators 44 and 45 are respectively disposed on the outer mass portions 11 and 12, and the vibration monitors 50 and 51 are respectively disposed on the central mass portions 3 and 7 adjacent to the outer mass portions 11 and 12. Thus, when two of the mass portions adjacent to each other vibrate in opposite phases, the vibration monitors 50 and 51 output a normal monitor signal Vm' (for example, see FIG. 9) which enables self-excited vibration, which will be described later. In this case, the normal monitor signal Vm' is set so as to have a desired waveform by adjusting, for example, the numbers, shapes, and facing areas of the mutually opposing electrodes of the monitor electrodes 46 to 49.

The control circuit 52 of the angular rate sensor 41 is constructed such that a drive signal Vd is fed back so as to output the normal monitor signal Vm' from the vibration monitors 50 and 51, and, with this feedback control, each mass portion is maintained in a resonant state (in a self-excited vibrating state) in the normal vibration mode.

Referring to FIG. 8, the control circuit 52 disposed between the vibration generators 44 and 45 and the vibration monitors 50 and 51 of the angular rate sensor 41 will be described. The control circuit 52 is configured to maintain each mass portion in a resonant state with the vibration generators 44 and 45 when the normal monitor signal Vm' is input from the vibration monitors 50 and 51, and is defined by two C-V conversion circuits 53, a phase-shift circuit 55, and an automatic-gain-control circuit 56, which will be described later.

The two C-V (capacitance-voltage) conversion circuits 53 respectively connected to the output terminals of the vibration monitors 50 and 51 convert variances in capacitance of the corresponding vibration monitors 50 and 51 into variances in voltage and output these variances in voltage as voltage signals.

Meanwhile, when the central mass portions 3 and 7 vibrate in opposite phases, these two voltage signals have opposite phases. With a differential amplifier 54, a difference between the two voltage signals is computed, is amplified, and is output as a monitor signal Vm into the phase-shift circuit 55. In this case, the vibration monitors 50 and 51, the C-V conversion circuits 53 and the differential amplifier 54 are designed such that the monitor signal Vm after being subject to differential amplification has an appropriate phase.

The phase-shift circuit 55 generates a correction signal advanced in phase by a predetermined difference (for example, 90°) relative to, for example, the monitor signal Vm and outputs it to the automatic-gain-control circuit 56.

The automatic-gain-control circuit 56 connected to the output terminal of the phase-shift circuit 55 outputs the drive signals Vd in opposite phases to, for example, the right and left vibration generators 44 and 45 via amplifies 57 and 58 and a reverse amplifier 59 so as to cause the mass portions 3, 7, 11, and 12 to vibrate in the X-axis direction.

Meanwhile, when the mass portions 3, 7, 11, and 12 vibrate in a resonant state, it is known that the phase of the monitor signal Vm is delayed by 90° relative to the drive signal Vd.

Hence, the automatic-gain-control circuit 56 generates the drive signal Vd that is advanced in phase by 90° relative to the monitor signal Vm by using a correction signal generated by the phase-shift circuit 55. The automatic-gain-control circuit 56 also amplifies the signal level (amplitude) of the drive signal Vd such that the monitor signal Vm maintains a predetermined signal level, and outputs it to the vibration generators 44 and 45.

With this arrangement, the automatic-gain-control circuit 56 matches the frequency of the drive signal Vd to a resonant frequency of the mass portions by feeding back the drive signal Vd, thereby enabling each mass portion to consistently vibrate in a resonant state (hereinafter, referred to as a self-excited vibration operation a self-excited vibrating state) and to maintain a constant amplitude in such a resonant state.

Meanwhile, when the angular rate sensor 41 is in operation, the drive forces F3' and F4' in opposite phases are exerted on the outer mass portions 11 and 12 by the vibration generators 44 and 45, respectively, the vibrations thereof are transferred to the central mass portions 3 and 7 via the outer support beams 13, thereby causing each of the mass portions 3, 7, 11, and 12 to vibrate, for example, in the normal vibration mode shown in FIG. 2 in the first preferred embodiment or in the vibration mode in Comparative Example 1 shown in FIG. 3. In this case, since the drive forces F3' and F4' are in opposite phases, the vibration modes in Comparative Example 2 and 3 are not excited.

When the normal vibration mode is excited, and the central mass portion 3 (or the central mass portion 7) vibrates in an opposite phase to that of the outer mass portion 11 (or the outer mass portion 12), the normal monitor signal Vm' enabling a self-excited operation is output from each of the vibration monitors 50 and 51. With this structure, by feeding back the drive signal Vd via the normal monitor signal Vm', the automatic-gain-control circuit 56 maintains a self-excited vibrating state in the normal vibration mode.

On the contrary, when the vibration mode in Comparative Example 1 is excited, and the central mass portion 3 (or the central mass portion 7) and the outer mass portion 11 (or the outer mass portion 12) vibrate in phase with each other, a signal having a waveform different from that of the normal monitor signal Vm' is output from each of the vibration monitors 50 and 51. Accordingly, since the self-excited vibrating state cannot be maintained in the vibration mode in Comparative Example 1, the normal vibration mode is immediately excited instead of the above-described vibration mode.

As a result, the angular-rate detecting apparatus having the above-described structure according to the present preferred embodiment also provides substantially the same advantages as that according to the first preferred embodiment. In particular, the angular-rate detecting apparatus according to the present preferred embodiment is configured such that the vibration generators 44 and 45 are respectively disposed on the outer mass portions 11 and 12, and the vibration monitors 50 and 51 are disposed on the central mass portions 3 and 7 respectively adjacent to the outer mass portions 11 and 12.

With this structure, when the outer mass portions 11 and 12 are driven, vibrating states of the central mass portions 3 and 7 respectively adjacent to the outer mass portions 11 and 12 are monitored by the vibration monitors 50 and 51, respectively. Thus, by feeding back an output state of the drive signal Vd by using the monitor signal Vm from each of the vibration monitors 50 and 51, the control circuit 52 causes the mass portions 3 and 12 and the corresponding mass portions 7 and 11 to vibrate in opposite phases, thereby effectively exciting the normal vibration mode.

In this case, when the central mass portions 3 and 7 and the corresponding outer mass portions 11 and 12 vibrate in opposite phases, and the normal vibration mode is excited, each of the vibration monitors 50 and 51 outputs the normal monitor signal Vm' and, in a vibration mode other than the normal vibration mode, the vibration monitors 50 and 51 output another monitor signal having a waveform different from that of the normal monitor signal Vm'.

With this arrangement, when the normal monitor signal Vm' is input from each of the vibration monitors 50 and 51, the control circuit 52 maintains each of the mass portions 3, 7, 11, and 12 in a resonant state by the vibration generators 44 and 45, and, when a monitor signal other than the normal monitor signal Vm' is input, since the control circuit 52 feeds back the drive signal Vd to be output to the vibration generators 44 and 45 so as to excite the normal vibration mode, only the normal vibration mode is stably excited.

Also, since the vibration monitors 50 and 51 are respectively disposed on the central mass portions 3 and 7 vibrating in opposite phases, variances in capacitances of two pieces of the vibration monitors 50 and 51 in opposite phases are subjected to differential amplification by the differential amplifier 54, and the result is output as the monitor signal Vm. With this arrangement, for example, noises due to disturbances, the second harmonic wave included in the variances in capacitances, and other noise is removed by the differential amplification, thereby achieving a low-skewed, accurate monitor signal Vm.

Meanwhile, in each of the foregoing preferred embodiments, the four mass portions 3, 7, 11, and 12 are connected by the outer support beams 13 by way of example. The present invention is, however, not limited to the above structure, and alternatively, for example, three or less pieces or five or more pieces of mass portions may be connected.

Although the angular rate generator according to the first preferred embodiment is configured such that all mass portions 3, 7, 11, and 12 have the individual vibration generators 22 to 25 respectively disposed thereon, the present invention is not limited to the above structure. Alternatively, the angular rate generator may be configured such that, for example, only a portion of the mass portions have vibration generators disposed thereon and the remaining mass portions have no vibration generators disposed thereon as long as the normal vibration mode can be excited.

Also, although the angular rate generator according to the second preferred embodiment is configured such that each of the mass portions 3, 7, 11, and 12 has any one of the vibration generators 44 and 45 and the vibration monitors 50 and 51 disposed thereon, the present invention is not limited to the above structure. Alternatively, the angular rate generator may be configured such that, for example, any one of the central mass portions 3 and 7 has a vibration monitor disposed thereon, and the other central mass portions have no vibration monitor disposed thereon. As described above, the angular rate generator according to the present invention may be configured such that, for example, a portion of the mass portions have vibration generators disposed thereon, other mass portions adjacent to the portion of the mass portions have vibration monitors disposed thereon, and the remaining mass portions have no vibration generators nor vibration monitors disposed thereon.

In addition, although each of the angular-rate detecting apparatus according to the foregoing preferred embodiments is configured such that an angular rate $\Omega$ about the Z-axis is detected, the present invention is not limited to the above structure Alternatively, the angular-rate detecting apparatus may be configured such that, for example, as in the known art, a mass portion vibrating in the X-axis direction is displaced in the Z-axis direction due to its angular rate $\Omega$ about the Y-axis and the displacement is detected as the angular rate $\Omega$ about the Y-axis.

It should be understood that the foregoing description is only illustrative of the present invention. Various alternatives and modifications can be devised by those skilled in the art without departing from the present invention. Accordingly, the present invention is intended to embrace all such alternatives, modifications and variations that fall within the scope of the appended claims.

What is claimed is:

1. An angular-rate detecting apparatus, comprising:
   a substrate;
   a plurality of mass portions juxtaposed to one another on the substrate in a predetermined direction;
   a support beam connecting the plurality of mass portions so as to enable each of the plurality of mass portions to be vibratable in a vibration direction substantially perpendicular to the predetermined direction along which the plurality of mass portions are juxtaposed to one another;
   a fixing portion fixing the support beam to the substrate;
   vibration generators vibrating two of the plurality of mass portions adjacent to each other in opposite phases in the vibration direction; and
   an angular rate detector detecting a displacement of a portion of the mass portions as an angular rate, displaced in a detection direction substantially perpendicular to the vibration direction in a state in which the mass portions are vibrating; wherein
   the vibration generators exert drive forces on the two mass portions adjacent to each other in opposite directions to each other; and
   among the plurality of mass portions, a ratio among the magnitudes of drive forces exerted on the respective mass portions by the vibration generators is substantially the same as a ratio among the products of masses and driven amplitudes of the corresponding mass portions.

2. The angular-rate detecting apparatus according to claim 1, wherein the vibration generators are individually disposed as individual vibration generators corresponding to the respective mass portions, and two of the individual vibration generators adjacent to each other generate drive forces in the opposite directions from each other.

3. The angular-rate detecting apparatus according to claim 1, wherein the plurality of mass portions includes four pieces of mass portions linearly juxtaposed to one another.

4. The angular-rate detecting apparatus according to claim 1, wherein the support beam includes outer support beam portions and inner support beam portions connecting the plurality of mass portions to one another.

5. The angular-rate detecting apparatus according to claim 1, wherein the plurality of mass portions are arranged symmetrically about a center of gravity of the angular-rate detecting apparatus.

6. The angular-rate detecting apparatus according to claim 1, wherein the fixing portion includes quadrangular mounts fixed on the substrate and arranged so as to surround the plurality of mass portions, extending portions disposed on side portions of the substrate and integral with the quadrangular mounts, and elastic arm portions disposed on the extend portions, connected to node portions of the support beam, and arranged so as to be spaced away from the substrate.

7. The angular-rate detecting apparatus according to claim 1, wherein each of the vibration generators includes a fixed drive electrode disposed on the substrate and a movable drive electrode disposed on a respective one of the plurality of mass portions.

8. The angular-rate detecting apparatus according to claim 7, wherein the fixed drive electrode includes a plurality of electrode plates disposed side by side in a comb shaped configuration and the movable drive electrode includes a plurality of electrode plates disposed side by side in a comb shaped configuration, the fixed drive electrode and the movable drive electrode are arranged such that the plurality of electrode plates of the fixed drive electrode are interdigitated with the plurality of electrode plates of the movable drive electrode.

9. The angular-rate detecting apparatus according to claim 1, wherein the angular rate detector includes a fixed detection electrode disposed on the substrate and a movable detection electrode disposed on a respective one of the plurality of mass portions.

10. The angular-rate detecting apparatus according to claim 9, wherein the fixed detection electrode Includes a plurality of electrode plates disposed side by side in a comb shaped configuration and the movable detection electrode includes a plurality of electrode plates disposed side by side in a comb shaped configuration, the fixed detection electrode and the movable detection electrode are arranged such that the plurality of electrode plates of the fixed detection electrode are interdigitated with the plurality of electrode plates of the movable detection electrode.

11. An angular-rate detecting apparatus, comprising:
a substrate;
a plurality of mass portions juxtaposed to one another on the substrate in a predetermined direction;
a support beam connecting the plurality of mass portions so as to enable each of the plurality of mass portion to be vibratable in a vibration direction substantially perpendicular to the predetermined direction along which the plurality of mass portions are juxtaposed to one another;
a fixing portion fixing the support beam to the substrate; and
an angular rate detector detecting displacement of a portion of the plurality of mass portions as an angular rate, displaced in a detection direction substantially perpendicular to the vibration direction in a state in which the mass portions are vibrating; wherein
at least one of the plurality of mass portions has a vibration generator disposed thereon, and another one of the plurality of mass portions adjacent to said at least one of the plurality of mass portions has a vibration monitor disposed thereon, monitoring vibrating state thereof and outputting monitor signal for controlling the vibration generator such that mass portions adjacent to each other vibrate in opposite phases in the vibration direction;
the vibration monitor is configured such that a normal monitor signal is output when said at least one of the plurality of mass portions and said another one of the plurality of mass portions vibrate in opposite phases; and
a control circuit is disposed between the vibration monitor and the vibration generator, the control circuit is configured such that each adiacent pair of the plurality of mass portions is caused to vibrate in opposite phases in a resonant state by the vibration generator when the normal monitor signal is input to the control circuit from the vibration monitor.

12. The angular-rate detecting apparatus according to claim 11, wherein the plurality of mass portions includes four pieces of mass portions linearly juxtaposed to one another.

13. The angular-rate detecting apparatus according to claim 11, wherein the support beam includes outer support beam portions and inner support beam portions connecting the plurality of mass portions to one another.

14. The angular-rate detecting apparatus according to claim 11, wherein the plurality of mass portions are arranged symmetrically about the center of gravity of the angular-rate detecting apparatus.

15. The angular-rate detecting apparatus according to claim 11, wherein the fixing portion includes quadrangular mounts fixed on the substrate and arranged so as to surround the plurality of mass portions, extending portions disposed on side portions of the substrate and integral with the quadrangular mounts, and elastic arm portions disposed on the extend portions, connected to node portions of the support beam, and arranged so as to be spaced away from the substrate.

16. The angular-rate detecting apparatus according to claim 11, wherein the vibration generator includes a fixed drive electrode disposed on the substrate and a movable drive electrode disposed on a respective one of the plurality of mass portions.

17. The angular-rate detecting apparatus according to claim 16, wherein the fixed drive electrode includes a plurality of electrode plates disposed side by side in a comb shaped configuration and the movable drive electrode includes a plurality of electrode plates disposed side by side in a comb shaped configuration, the fixed drive electrode and the movable drive electrode are arranged such that the plurality of electrode plates of the fixed drive electrode are interdigitated with the plurality of electrode plates of the movable drive electrode.

18. The angular-rate detecting apparatus according to claim 11, wherein the angular rate detector includes a fixed detection electrode disposed on the substrate and a movable detection electrode disposed on a respective one of the plurality of mass portions.

19. The angular-rate detecting apparatus according to claim 18, wherein the fixed detection electrode includes a plurality of electrode plates disposed side by side in a comb shaped configuration and the movable detection electrode includes a plurality of electrode plates disposed side by side in a comb shaped configuration, the fixed detection electrode and the movable detection electrode are arranged such that the plurality of electrode plates of the fixed detection electrode are interdigitated with the plurality of electrode plates of the movable detection electrode.

* * * * *